April 17, 1956 J. R. FREDERICK 2,742,295

TRANSDUCER AND STYLUS THEREFOR

Filed March 31, 1951 2 Sheets-Sheet 1

Inventor
JEAN ROBERT FREDERICK

By Francis J. Klempay, Attorney.

April 17, 1956 J. R. FREDERICK 2,742,295

TRANSDUCER AND STYLUS THEREFOR

Filed March 31, 1951 2 Sheets-Sheet 2

INVENTOR
JEAN ROBERT FREDERICK

BY Francis J. Klempay
ATTORNEY

United States Patent Office 2,742,295

Patented Apr. 17, 1956

2,742,295

TRANSDUCER AND STYLUS THEREFOR

Jean Robert Frederick, Conneaut, Ohio, assignor to The Astatic Corporation, Conneaut, Ohio Application March 31, 1951, Serial No. 218,683

4 Claims. (Cl. 274—37)

This invention relates to an improved transducer and stylus therefor for use in phonograph pick-up apparatus, particularly of the mechanical-electrical transducer type. The primary object of the invention is the provision of a simplified arrangement for assembling a replaceable stylus assembly on the transducer cartridge whereby the parts thereof may be economically manufactured and assembled, whereby the stylus may be readily removed from and assembled on the transducer cartridge without the aid of any tools but when assembled will have an extremely rigid and secure conection with the mechanical driving elements of the transducer to thereby give superior vibration transmitting results, and whereby the stylus may be housed substantially in its entirety in a recess or groove formed in a smooth bottom wall of the transducer cartridge for the protection of both the stylus and any underlying record tablet as will become apparent below.

A further object of my invention is the provision of an improved stylus for use in the improved assembly outlined above which will have sufficient compliance in vertical and lateral directions to reproduce, in combination with the transducer, the frequencies and amplitudes of the record undulations with utmost fidelity.

It is common practice in the design and construction of mechanical-electrical transducers for phonograph reproduction to assemble the transducer itself together with a drive rod or chuck in a unitary cartridge which may be replaceably assembled in the swinging tone arm of the record player. Such drive rod or chuck is usually mounted for limited rotational movement whereby the undulations of the record groove may be faithfully transmitted to the transducer which in many devices is a piezoelectric element as will be understood. I preferably utilize such general assembly but in accordance with the principles of this invention the drive rod or chuck, if positioned horizontally, is provided with a depending arm to the bottom end of which is attached the stylus and stylus holder of my invention. Also the cartridge asembly may be so constructed that the drive rod itself is positioned vertically in depending relation. In either case the lower end of the depending member is utilized for attachment of the sylus and the stylus itself consists of a generally horizontally disposed member bearing at its outer free end a depending stylus tip for engaging the grooves of the record tablet. This arrangement provides a number of advantages, in addition to those mentioned above, which will become apparent upon consideration of the following detailed specification and the accompanying drawing wherein there is disclosed a preferred embodiment of the invention:

Figure 1:
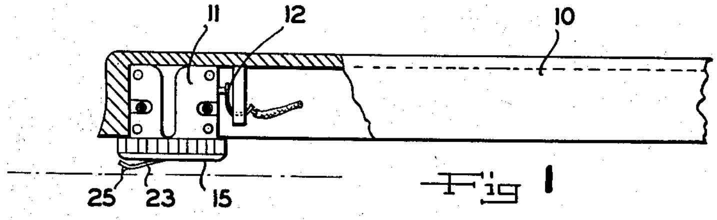
Figure 1 is a fragmentary side elevation, partly broken away, of a tone arm bearing a transducer cartridge having the stylus and stylus holder of my invention.

In Figure 1 of the drawing, the reference numeral 10 designates the free end portion of a conventional tone arm which is open along its bottom edge for insertion of the transducer cartridge therein designated generally by the reference numeral 11. The cartridge 11 is releasably retained in the arm 10 by friction and by spring clips 12 which are carried by the arm and which also serve as electrical connectors—contacting the electrical contacts 13 projecting rearwardly out of the casing of the cartridge 11. Housed within the casing of the cartridge 11 is a mechanical-electrical transducer, not shown, which is provided with a driving member of either of the types mentioned above—having a depending actuating rod 14 positioned substantially in the center of the cartridge 11. As shown more clearly in Figure 2, the bottom wall of the cartridge 11 is formed with a slightly convexed bottom surface 15 which is polished smoothly so as to avoid injury to the record surface in case the transducer cartridge is brought into engagement with such surface. Formed longitudinally in the bottom surface 15 is a fairly wide and deep groove 16 to receive the stylus and stylus holder to be described below. It should be observed that the bottom wall of the transducer cartridge extends outwardly beyond the side walls thereof to form a peripheral flange 17 which is serrated as shown to facilitate gripping of the cartridge with the fingers and insertion and removal thereof with respect to the tone arm.

Rigidly secured to the lower free end of the drive rod 14 and housed within the central portion of the groove 16 is a stylus holder 18 in the form of a longitudinally disposed plate having its side edges bent downwardly and inwardly as at 19. The side edge portions 19 are bent inwardly along converging lines so that there is provided in effect a tapering socket for the reception of the stylus now to be described.

Figures 2, 3, 4, 5, 6, 7, 8, 9:
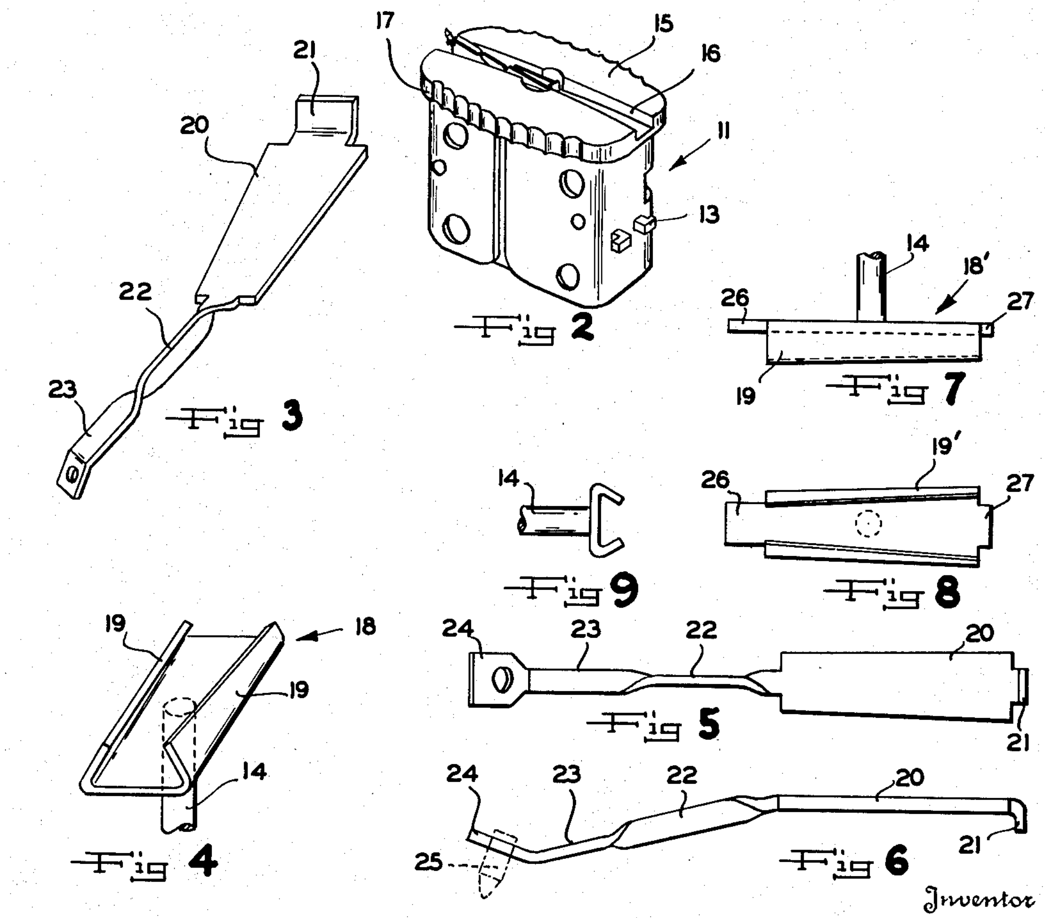
Figure 2 is a perspective view of the cartridge and stylus assembly of Figure 1, the assembly being inverted for clarity of illustration.
Figure 3 is a perspective view of the improved stylus of my invention.
Figure 4 is a fragmentary perspective view of the improved stylus holder of my invention.
Figures 5 and 6 are plan and side elevation views, respectively, of my improved stylus.
Figures 7, 8 and 9 are fragmentary side, bottom, and end views, respectively, of a modified form of stylus holder which may be utilized with the stylus of Figures 3, 5 and 6.

The stylus of my invention has a principal body portion formed of a unitary piece of sheet metal and as shown in Figures 3, 5 and 6 it is provided with a tapering anchor section 20 for sliding fit in the socket 18. Integral with one end of the section 20 is a depending tab 21 and integral with the opposite end of the section 20 is a longitudinally disposed shank which is twisted to provide a section 22 lying in a vertical plane and an outer section 23 lying in a substantially horizontal plane. As shown, the sections 22 and 23 are generally aligned with each other but are tilted downwardly with respect to the anchoring section 20 and the outer extremity of the shank of the stylus is bent upwardly as at 24 to mount a forwardly and downwardly extending tip 25.

To assemble the stylus thus described in the depending holder 18 it is only necessary to lay the shank portion of the stylus between the two side edges 19 of the holder with the tab 21 projecting downwardly and to thereafter slide the stylus longitudinally of the holder until the anchoring portion 20 is tightly wedged between the inwardly bent side edge portions 19 of the holder 18. The tapering configurations of the parts causes the stylus to become tightly wedged in the holder and the inwardly bent nature of the side edge portions 19 of the holder forces the flat anchoring portion 20 of the stylus into tight flat engagement with the flat center portion of the holder. This insures that the stylus will be properly oriented and aligned with respect to the drive rod 14. The stylus may be readily removed by engaging the depending tab 21 with the thumb nail and applying rearward force to thereby disengage the stylus from the socket.

By referring to Figure 1 it will be observed that the only portion of the stylus and its holder which projects below the smooth bottom surface 15 of the transducer cartridge is the tab 25 and sections 23 and 24. Since these are located at the outer free end of the shank of the stylus and since this shank is quite long and flexible these parts are easily moved into the surface of the lower wall of the cartridge so that in the event the tone arm is dropped on the record or if an unusual downward force is applied to the outer free end of the tone arm the smooth surface 15 will come in contact with the record to thereby avoid injury to either the record or the stylus or the transducer.

In the embodiment of the invention shown in Figures 7, 8 and 9 the flat horizontal portion of the stylus holder is elongated fore and aft as at 26 and 27, respectively, to increase the longitudinal bearing of the stylus if considered necessary or desirable.

Figure 10:
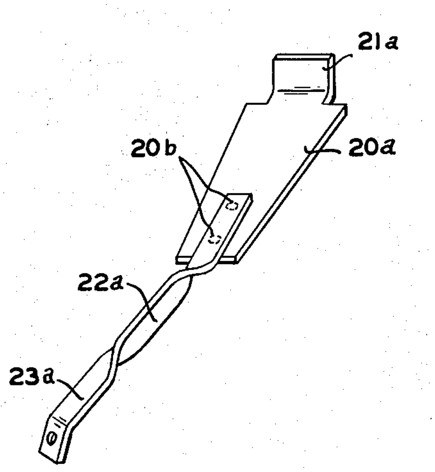
Figure 10 is a modified form of stylus constructed in accordance with the principles of my invention.
Figure 11:
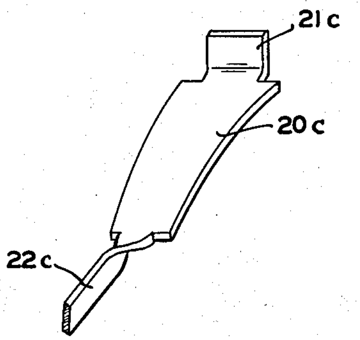
Figure 11 is a fragmentary view of yet another form of stylus constructed in accordance with my invention.

In the embodiment of the invention shown in Figure 10 the main body portion **20*a* of the stylus is made separately from the shank portion 22*a* and 23*a* of the stylus, these two parts being preferably joined together by a pair of spot welds as shown at 20*b*. This construction enables the shank portion of the stylus to be fabricated of a strip of metal of uniform cross-sectional shape and area and, further, enables this portion of the stylus to be fabricated of spring stock which may not be particularly suitable or which is too expensive for the part 20*a***.

Figure 12:
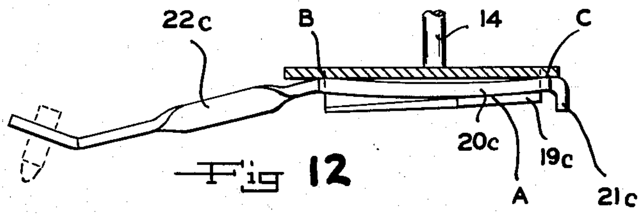
Figure 12 shows the stylus of Figure 11 inserted in a stylus holder.
Figure 13:
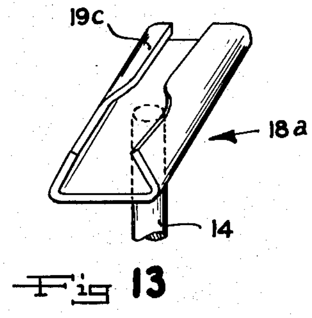
Figures 13 and 14 are front and rear perspective views, respectively, of the stylus holder of Figure 12.
Figure 14:
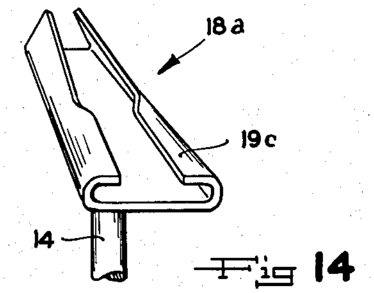

In the embodiment of the invention shown in Figures 11 through 14 the principal body portion **20*c* of the stylus is arcuately deformed in a vertical direction as shown and the flanged side edge portions of the stylus holder 18*a* are rolled inwardly to provide a more secure bearing for the bottom surface of the body portion 20*c* of the stylus when the latter is slid longitudinally into position in the holder as shown in Figure 12. In practice, the stylus 20*c*—22*c* as well as the holder 18*a* are preferably made of stainless steel having high strength, corrosion-resistance, and spring qualities. Upon the parts being assembled the inwardly rolled flanges 19*c* tightly engage the center portion of the convex bottom surface of the stylus part 20*c* as indicated at A in Figure 12 to thereby force the ends of the portion 20*c* into tight engagement with the flat base of the holder 18*a* as shown at B and C. This provides a simple yet extremely rigid mounting for the stylus in the holder and insures against any looseness between these parts which might effect the fidelity of the sound reproduction. Nevertheless, the stylus is easily removed and replaced by engaging the integral tab 21*c* with a finger nail or any common tool and moving the same in the diverging direction of the holder 18*a***.

It should be observed particularly that in any of the embodiments herein shown the stylus is readily replaceable in the holder with the holder in position in the groove of the cartridge casing. This is so because the direction of longitudinal sliding movement of the stylus when inserting and removing the same is coincident with the longitudinal axis of the groove in the bottom wall of the cartridge housing. It should therefore be apparent that I have provided an improved transducer and stylus combination and an improved stylus and holder which accomplishes the objects initially set out. The parts are simple in design and economical to produce but yet are very easily assembled with or without the aid of tools and when assembled provide a steadfast and efficient driving interconnection between the stylus tip and the transducer housed in the cartridge. Further, while the stylus is horizontally elongated to allow ready vertical flexure whereby valuable record tablets may be protected the stylus is located almost entirely in a protective groove formed in the bottom wall of the cartridge casing and may readily be removed and replaced in said groove.

Having thus described the principles and advantages of my invention and certain representative structures for utilizing the invention what I claim is novel and what I desire to secure by Letters Patent is:

1. In a phonograph pick-up having a casing formed with a bottom wall and enclosing a transducer the improvement which comprises a longitudinally extending groove in said bottom wall, a driver for said transducer mounted in said casing for pivotal movement about a vertical axis, a stylus holder rigidly secured to the lower end of said driver and extending longitudinally in said groove, said stylus holder comprising an elongated plate having downwardly and inwardly directed side edge flanges converging toward each other in the longitudinal direction and being narrower at the forward end of said plate, and a stylus having a wedge-shaped body portion adapted to be slidably received in a forward longitudinal direction in said holder and having a flexible longitudinally extending shank portion mounting a record-engaging tip, said body portion as well as said shank portion being substantially wholly received in said groove along with said holder.

2. Apparatus according to claim 1 further characterized in that said shank portion of said stylus projects outwardly from one longitudinal end of said body portion, and said body portion having an integral downwardly extending tab at its other end portion.

3. Apparatus according to claim 1 further characterized in that said body portion is arcuately deformed in a vertical direction so as to present the convex surface thereof in a downward direction, said flanges engaging and exerting an upward pressure on said convex surface intermediate the longitudinal ends thereof whereby said body portion is caused to forcibly contact said plate at two spaced points adjacent the ends of said body portion.

4. A stylus assembly for phonograph reproducing apparatus comprising an elongated and generally horizontally extending flat body member, said body member being wedge-shaped in horizontal outline and being narrower at its forward end, an elongated yieldable shank projecting from said forward end of said body member and mounting a downwardly directed record engaging tip on its outer free end, an integral tab extending downwardly from the other end of said body member; said stylus assembly adapted to be slidably received in an assembly comprising a casing formed with a longitudinally extending groove in the bottom wall and supporting a transducer, a vertically disposed driver for said transducer, and a stylus holder rigidly secured to said driver and extending longitudinally in said groove and having an elongated plate with downwardly and inwardly directed side edge flanges converging toward each other and being narrower at the forward end of said plate and said stylus holder being complementary to said wedge-shaped body member and adapted to frictionally receive said body portion upon forward horizontal application of said body portion into said holder in a forward longitudinal direction.

References Cited in the file of this patent

UNITED STATES PATENTS

| | | |
|---|---|---|
| 2,363,497 | Begun | Nov. 28, 1944 |
| 2,426,061 | Snepvangers | Aug. 19, 1947 |
| 2,432,444 | Roberts | Dec. 9, 1947 |
| 2,517,423 | Gillmor | Aug. 1, 1950 |
| 2,529,438 | Wennerbo | Nov. 7, 1950 |
| 2,543,127 | Pickering | Feb. 27, 1951 |
| 2,547,227 | O'Neal | Apr. 3, 1951 |
| 2,565,837 | Ansar | Aug. 28, 1951 |
| 2,594,948 | Lynch | Apr. 29, 1952 |